(12) United States Patent
Correnti et al.

(10) Patent No.: US 11,032,177 B2
(45) Date of Patent: Jun. 8, 2021

(54) NETWORK ACTIVITY VALIDATION

(71) Applicant: Alarm.com Incorporated, Tysons, VA (US)

(72) Inventors: Matthew Daniel Correnti, Newtown Square, PA (US); Robert Nathan Picardi, Herndon, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/451,564

(22) Filed: Jun. 25, 2019

(65) Prior Publication Data

US 2019/0394106 A1  Dec. 26, 2019

Related U.S. Application Data

(60) Provisional application No. 62/689,431, filed on Jun. 25, 2018.

(51) Int. Cl.
| | |
|---|---|
| *H04L 12/26* | (2006.01) |
| *G06F 1/3231* | (2019.01) |
| *G06F 3/0484* | (2013.01) |
| *H04L 29/06* | (2006.01) |
| *H04W 4/02* | (2018.01) |
| *H04W 52/02* | (2009.01) |

(52) U.S. Cl.
CPC ........ *H04L 43/0876* (2013.01); *G06F 1/3231* (2013.01); *G06F 3/04842* (2013.01); *H04L 63/10* (2013.01); *H04W 4/02* (2013.01); *H04W 52/0254* (2013.01)

(58) Field of Classification Search
CPC ................ H04L 53/0876; H04L 43/0876
See application file for complete search history.

(56) References Cited

U.S. PATENT DOCUMENTS

| | | | |
|---|---|---|---|
| 7,971,237 B2 | 6/2011 | Caslin et al. | |
| 7,992,777 B1 | 8/2011 | Block et al. | |
| 9,646,486 B1 * | 5/2017 | Trundle | G08B 25/001 |
| 9,666,047 B2 * | 5/2017 | Slavin | G08B 25/14 |

(Continued)

OTHER PUBLICATIONS

PCT International Search Report and Written Opinion in International Application No. PCT/US2019/038954, dated Sep. 25, 2019, 12 pages.

*Primary Examiner* — Nicholas P Celani
(74) *Attorney, Agent, or Firm* — Fish & Richardson P.C.

(57) ABSTRACT

Methods, systems, and apparatus, including computer programs encoded on computer storage media, for validating network activity. One of the methods includes receiving data identifying network activity for an online account; determining one or more users associated with the online account; determining, for each of the one or more users, a current physical activity in which the user is participating; determining, for each of the current physical activities, a likelihood that the corresponding user initiated the network activity while participating in the current physical activity; determining, for each of the current physical activities, whether the corresponding likelihood satisfies a threshold likelihood; and in response to determining that at least one of the corresponding likelihoods satisfies the threshold likelihood, providing an alert about the network activity to one of the one or more users associated with the online account.

16 Claims, 4 Drawing Sheets

(56) References Cited

U.S. PATENT DOCUMENTS

| | | | |
|---|---|---|---|
| 2014/0297527 A1 | 10/2014 | McLaughlin et al. | |
| 2015/0326535 A1* | 11/2015 | Rao | H04L 63/029 726/15 |
| 2018/0097788 A1* | 4/2018 | Murthy | H04L 63/102 |
| 2018/0137858 A1 | 5/2018 | Saxena et al. | |
| 2019/0018939 A1* | 1/2019 | Lev | G06K 9/6288 |

* cited by examiner

NETWORK ACTIVITY VALIDATION

CROSS-REFERENCE TO RELATED APPLICATION

This application claims the benefit of U.S. Application 62/689,431, filed Jun. 25, 2018, the contents of which are incorporated by reference.

FIELD

This disclosure generally relates to monitoring systems.

BACKGROUND

Some people participate in network activities each day. For instance, a person may post an article online, write an electronic note to a friend, or update firewall settings for their computer. In some instances, a person may watch a movie online, e.g., a free or rented movie, download a song, or download and install an application on their computer.

Various computer devices provide network security. For instance, a network may include a firewall, an intrusion detection system, or an antivirus, e.g., executing on a network device.

SUMMARY

In general, one innovative aspect of the subject matter described in this specification can be embodied in methods that include the actions of receiving data identifying network activity for an online account; determining one or more users associated with the online account; determining, for each of the one or more users, a current physical activity in which the user is participating; determining, for each of the current physical activities, a likelihood that the corresponding user initiated the network activity while participating in the current physical activity; determining, for each of the current physical activities, whether the corresponding likelihood satisfies a threshold likelihood; and in response to determining that at least one of the corresponding likelihoods satisfies the threshold likelihood, providing an alert about the network activity to one of the one or more users associated with the online account. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Determining, for each of the current physical activities, the likelihood may include determining, for each of the current physical activities, a low likelihood that the corresponding user initiated the network activity while sleeping, driving, or participating in a sport. The method may include in response to determining that at least one of the corresponding likelihoods satisfies the threshold likelihood, blocking completion of the network activity for the online account. Blocking completion of the network activity for the online account may include notifying a third party system to cause the third party system to block completion of the network activity for the online account.

In some implementations, the method may include in response to determining that at least one of the corresponding likelihoods satisfies the threshold likelihood, removing the network activity for the online account from a network. Removing the network activity for the online account from the network may include removing identification of the network activity from a log. The network activity for the online account may include adjusting a security setting. Adjusting the security setting may include adjusting a firewall security setting. Determining, for each of the one or more users, the current physical activity in which the user is participating may include receiving, from one or more smart devices, data that indicates at least one of a property of a physical environment in which the smart device is located or a physical use of the smart device. Determining, for each of the one or more users, the current physical activity in which the user is participating may include analyzing the data received from the one or more smart devices to predict the current physical activity in which the user is participating. The data may indicate the property of the physical environment. The property of the physical environment may be a temperature or a humidity of the environment in which the smart device is located.

In some implementations, determining, for each of the one or more users, the current physical activity in which the user is participating may include for at least one of the one or more users: determining a physical location of an asset associated with the user; and determining the current physical activity for the user using the physical location of the asset. Determining the physical location of the asset associated with the user may include determining a physical location of a vehicle for the user. Determining the current physical activity for the user using the physical location of the asset may include determining whether the user is operating the vehicle using the physical location of the vehicle. Determining the physical location of the asset associated with the user may include determining a physical location of a mobile device for the user. Determining the current physical activity for the user using the physical location of the asset may include determining whether the user likely initiated the network activity given the physical location of the mobile device.

In some implementations, the method may include determining a type of the network activity for the online account. Determining, for each of the current physical activities, the likelihood that the corresponding user initiated the network activity while participating in the current physical activity may include determining, for each of the current physical activities, the likelihood that the corresponding user initiated the type of the network activity while participating in the current physical activity. The method may include determining, for each of the one or more users, a physical location of the user. Determining, for each of the current physical activities, the likelihood that the corresponding user initiated the network activity while participating in the current physical activity may include determining, for each of the current physical activities, the likelihood that the corresponding user initiated the network activity while participating in the current physical activity at the physical location.

According to another innovative aspect of the subject matter described in this specification, a monitoring system is configured to monitor a property. The monitoring system includes a sensor that is located at the property and that is configured to generate sensor data that reflects an attribute of the property; and a monitor control unit that is configured to: receive data identifying network activity for an online account; determine a user associated with the online account; based on the sensor data, determine a current physical activity in which the user is participating; determine a likelihood that the user initiated the network activity while participating in the current physical activity; determine whether the likelihood satisfies a threshold likelihood; and, in response to determining that the corresponding likelihood satisfies the threshold likelihood, provide an alert about the network activity to user associated with the online account.

This implementation and other implementations may include one or more of the following optional features. The monitor control unit is configured to determine the current physical activity in which the user is participating by determining that the user is sleeping, driving, or participating in a sport; and determine whether the likelihood satisfies a threshold likelihood by determining that the likelihood does not satisfy the threshold. The monitor control unit is configured to determine whether the likelihood satisfies a threshold likelihood by determining that the likelihood does not satisfy the threshold; and prevent completion of the network activity for the online account. The monitor control unit is configured to prevent completion of the network activity for the online account by instructing a third party system to prevent completion of the network activity for the online account. The monitor control unit is configured to determine whether an arming status of the monitoring system is armed stay, armed away, or unarmed; and determine the current physical activity in which the user is participating based on whether the arming status of the monitoring system is armed stay, armed away, or unarmed. The network activity for the online account comprises adjusting a security setting.

The action of adjusting the security setting comprises adjusting a firewall security setting. The monitoring system includes an electronic device that is associated with the user and that generates location data or motion data for the user. The monitor control unit is configured to determine a current physical activity in which the user is participating by determining a physical location of the electronic device based on the location data or the motion data; and determining the current physical activity of the user based on the physical location of the electronic device. The monitor control unit is configured to determine a physical location of a vehicle of the user based on the physical location of the electronic device; and determine the current physical activity of the user by determining whether the user is operating the vehicle based on the physical location of the vehicle. The monitor control unit is configured to determine a physical location of the user based on the physical location of the electronic device; and determine the current physical activity of the user by determining the current physical activity of the user based on the physical location of the user. The monitor control unit is configured to determine the threshold likelihood based on the network activity. The monitor control unit is configured to determine the current physical activity in which the user is participating based on a location of the sensor.

The subject matter described in this specification can be implemented in various embodiments and may result in one or more of the following advantages. In some implementations, the methods and systems described below may improve network security by alerting a user of suspicious network activity, blocking suspicious network activity, removing suspicious network activity, performing another action in response to detection of suspicious network activity, or a combination of two or more of these. In some implementations, the methods and systems described below may automatically prevent network activity, e.g., particular types of network activity, when a person is performing specific activities, improving network security.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
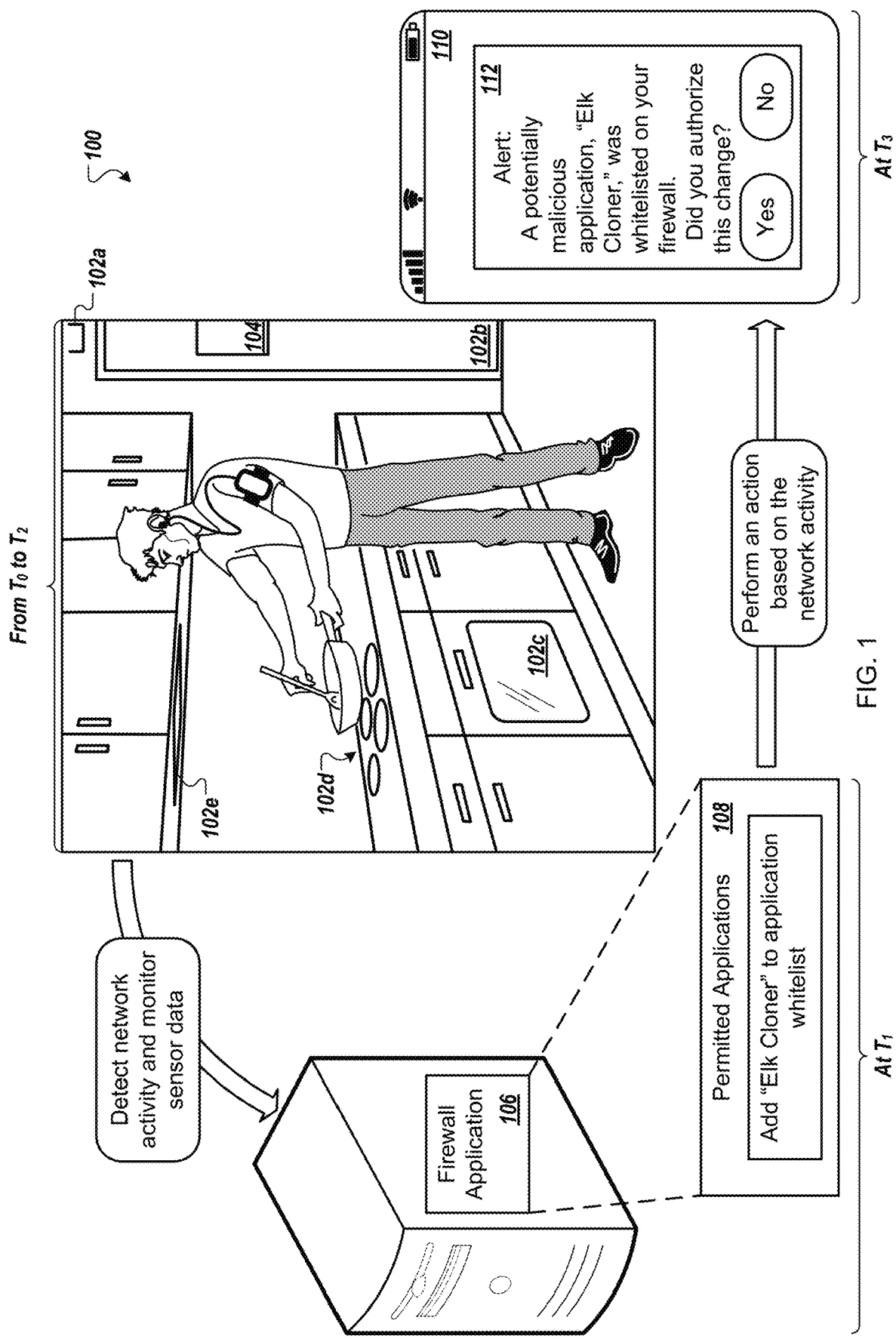
FIG. 1 is an example of an environment in which a network-activity validation system analyzes network activity.

A network-activity validation system may receive and analyze data from multiple devices, e.g., including smart devices, to ensure that detected network activity was initiated by a user. When the network-activity validation system determines that a user likely did not initiate a network activity, e.g., a change to a firewall or a network account, the network-activity validation system may generate an alert notifying the user of the detected network activity. Instead of or in addition to generating the alert, the network-activity validation system may perform one or more automated actions in response to detecting the network activity. For example, the network-activity validation system may block completion of the network activity, remove identification of the network activity from a corresponding account, cause a system to adjust one or more settings for an account associated with the network activity, or a combination of two or more of these.

When the network-activity validation system detects network activity that indicates the initiation of a process that includes other activity, such as the beginning of a malicious computer attack or installation of a malicious software program over a network, the network-activity validation system can block completion of the network activity. For instance, the network-activity validation system may detect an unknown computer system gaining access to a home network, gather smart device data, determine a likely current activity of a user based on the smart device data, and determine whether the user likely participated in the unknown computer system gaining access to the home network. When the network-activity validation system determines that the user likely participated in the network activity, e.g., the user is working at home and allowed a remote helpdesk application access to their home network, the network-activity validation system may determine to take no further action. But when the network-activity validation system determines that the user did not likely participate in the network activity, e.g., the user is cooking dinner, the network-activity validation system may take further action, such as an automated action to block the network activity, providing a notification to the user, or both.

When the network-activity validation system determines to remove identification of the network activity from a corresponding account, the network-activity validation system may remove data from a log, or another database, that identifies the network activity. For instance, the network-activity validation system may identify an access log for a computer on the home network, locate an entry in the log that indicates access to the computer by the unknown computer system, and remove the entry from the log. The network-activity validation system may perform one or more actions based on user configuration of the network-activity validation system. For example, the network-activity validation system would not remove an entry from a log without prior user authorization of a setting that indicates that the network-activity validation system should perform such removal.

The network-activity validation system may determine an account associated with the network activity. Some examples of accounts may include an antivirus account, e.g., with an antivirus service provider, a firewall account, a computer account, e.g., for the user's home computer or a network security device, or another appropriate type of account. The network-activity validation system may automatically update one or more settings for the account based on the detected network activity. The automatic update may be based on configuration settings for the network-activity validation system. In some examples, the network-activity validation system may update a firewall setting to block an internet protocol (IP) address of the unknown computer system from gaining access to the home network. In some examples, the network-activity validation system may temporarily disable account use for a predetermined period of time, e.g., may block all home network access for the predetermined period of time.

FIG. 1 is an example of an environment 100 in which a network-activity validation system analyzes network activity. For instance, the network-activity validation system monitors network activity and determines whether to perform an action in response to some of the network activity using sensor data received from sensors 102*a-e* in the environment 100.

The environment 100 includes multiple sensors 102*a-e*. The sensors 102*a-e* may be sensors in a person's home. Some of the sensors may be included in other devices, e.g., in a smart device. Some of the sensors may be their own device. For instance, the sensor 102*a* may be a motion sensor, a smoke detector, or a carbon monoxide detector, to name a few examples. When the sensor 102*a* is a smoke detector or a carbon monoxide detector, the sensor 102*a* may include a thermometer to determine a temperature of a room in the person's home, e.g., the temperature of a kitchen.

The network-activity validation system may use the motion sensor or the thermometer to determine a physical activity of a person. For example, the network-activity validation system can receive motion data from a motion sensor and determine, using the motion data, a likelihood that a person is in the room using the motion data. When the motion data indicates no movement in the room, the network-activity validation system may determine that there is a low likelihood that the person is in the room. Depending on the type and amount of motion represented by the motion data, the network-activity validation system may determine a higher likelihood that the person is in the room.

The network-activity validation system can use temperature data to determine a likelihood that a person is in the room, performing an activity in the room, or both. For instance, the network-activity validation system may determine a likelihood that a person is cooking in the kitchen although the person might not currently be in the kitchen at the time sensor data, analyzed by the network-activity validation system, was captured, e.g., the person may have gone into the dining room to set the table. The network-activity validation system may determine that a person has a higher likelihood of performing an activity in a room when the temperature is different than a predetermined temperature for the room. When the room is a kitchen, the network-activity validation system may determine that there is a higher likelihood when a current temperature is higher than a normal kitchen room temperature, e.g., caused by use of the stove or oven.

The network-activity validation system may determine temperature trends for any particular room in a home and use the temperature trends when determining whether a person is likely performing an activity in the room. For instance, when the temperature trends indicate that a room, e.g., a sun room, is normally cool at night and warm during the day and the network-activity validation system detects a cooler than normal day-time temperature, the network-activity validation system may determine that there is a higher likelihood that a person is performing an activity in the room, e.g., because the person turned on the air conditioning in the room.

The sensor 102*b* can be part of a fridge. The fridge may include a door sensor that detects opening of a fridge door, a light sensor that detects when the fridge light turns on, or another sensor that detects user interaction with the fridge. For example, another sensor may be a touch sensor 104 on the fridge door that receives input requesting water or a fridge setting adjustment. The network-activity validation system may use data from one or more fridge sensors to determine whether a person recently interacted with the fridge, e.g., when the door recently opened, the light recently turned on, or the touch sensor 104 recently received user input.

Similarly, an oven sensor 102*c* or a stove sensor 102*d* can detect user interaction with the corresponding device. The sensors 102*c-d* may provide user safety features, e.g., to make sure that the oven or stove is not left on, to allow remote deactivation of the corresponding device, or both. The sensors 102*c-d* can also provide the network-activity validation system with output data to allow the network-activity validation system to determine a likely physical activity of a person, e.g., when the person configures the oven, the stove, or both, to provide such data. Some examples of data generated by the oven sensor 102*c*, the stove sensor 102*d*, or both, include whether the corresponding device is on, whether the device recently received user input, e.g., adjusting the device's temperature, or other appropriate sensor data.

A stove hood, that vents air from the kitchen, may include the sensor 102*e* that detects use of the stove hood, that enables automated activation of the stove hood, e.g., automatically when the stove is turned on, or both. The network-activity validation system may use data from the stove hood sensor 102*e* to determine a likely physical activity for a person. For example, when the network-activity validation system receives data from the stove sensors 102*d* and the stove hood sensor 102*e* that indicate use of the corresponding device, the network-activity validation system may determine that there is a higher likelihood that a person is cooking in the kitchen.

The environment 100 may include more or fewer sensors depending on the configuration of the devices connected to the network-activity validation system. Other example environments are described with reference to FIGS. 2A-C below. Some examples of additional sensors may include cameras, noise sensors, light controls, thermostats, televisions, radios, or security controls, to name a few examples. Types of sensors may vary depending on the room or other location in which the sensors 102a-e are positioned. For instance, a garden may include motion sensors, a camera, and a pressure sensor.

The network-activity validation system may analyze data from multiple sensors when determining a likely physical activity of a person. For instance, the network-activity validation system may include one or more models that correlate types of sensor data with likely physical activities. In one example, when the network-activity validation system receives sensor data indicating the kitchen lights are on and brief access to the fridge, the network-activity validation system may determine that there is a low likelihood that a person is cooking (although the network-activity validation system might not know an actual physical activity the user is participating in based on this sensor data alone). When the network-activity validation system receives sensor data indicating that the kitchen lights, the stove, and stove hood are on, an elevated kitchen temperature, e.g., because of stove use, and recent access to the fridge and sink use, e.g., from a sink sensor, the network-activity validation system may determine that a person is likely cooking in the kitchen.

For instance, during a time period from $T_0$ to $T_2$, the sensors 102a-e may capture data for the environment 100. When a person is cooking in a kitchen, the fridge sensor 102b may detect the user opening and closing the fridge to get ingredients for a meal. The stove sensor 102d and the stove hood sensor 102e may detect user interaction with the stove, e.g., the user turning the stove and the stove hood on. The thermometer 102a may detect an increased kitchen room temperature because the stove is turned on. A faucet sensor may detect a user turning the faucet in a sink on and off, e.g., using an electronic faucet. A garbage disposal sensor may detect a user turning a garbage disposal in a sink on.

At time $T_1$, during the time period from $T_0$ to $T_2$, the network-activity validation system may detect network activity, e.g., a firewall application 106 setting change. The setting change may be, for example, a change to a list of permitted applications 108 installed on a device that are allowed access to a network, e.g., the Internet, access to a particular computer directory, or both. The setting change may be the addition of an "Elk Cloner" application to the firewall's whitelist of authorized applications. The device on which the firewall application 106 is installed may be a dedicated firewall or another computer on which the firewall application executes.

The network-activity validation system analyzes sensor data, received from one or more of the sensors 102a-e, to determine whether to perform an action in response to the detected network activity, e.g., the firewall application 106 setting change. For instance, the network-activity validation system analyzes the sensor data to determine a physical activity the person is likely performing. The network-activity validation system may determine that the person is likely cooking because of the increased kitchen temperature and the user interaction with the fridge, the stove, and the stove hood.

Given the physical activity the person is likely performing, the network-activity validation system determines a likelihood that the person initiated the network activity, e.g., the setting change. For example, the network-activity validation system may determine that there is a low likelihood that the person initiated the firewall application 106 setting change because the person is likely cooking. The network-activity validation system may use a model of expected activities that indicates activities that can be or are generally performed together to determine the likelihood that the person initiated the network activity. For instance, the model may indicate that there is a low likelihood of a user changing a firewall application 106 setting while cooking. The model may be specific to the person, e.g., based on historical data, for a group of people, or both, e.g., when a historical model based on multiple people is customized for a particular person.

When the network-activity validation system determines that there is a low likelihood that the person initiated the network activity, e.g., because the user is likely cooking in the kitchen, the network-activity validation system determines an action to perform. For instance, the network-activity validation system may determine to alert the person about the firewall application 106 setting change. In response, the network-activity validation system may generate a message for the person, which can be presented on a mobile device 110 at time $T_3$, e.g., in the user interface 112. The message identifies the suspicious network activity detected by the network-activity validation system. The user interface 112 may include one or more options that request user input. For example, the user interface 112 may include a "yes" authorization button that indicates that the network activity is authorized by the person or a "no" authorization button that indicates that the network activity is not authorized by the person.

Receipt of data indicating user selection of one of the options may cause the network-activity validation system to perform a corrective action. For example, when the network-activity validation system receives data indicating selection of the "no" authorization button, the network-activity validation system may revert the firewall application 106 back to the settings prior to the detected setting change, may remove the setting change from the firewall application 106, e.g., remove the whitelist entry for the "Elk Cloner" application, block further changes to the firewall application 106 for a predetermined period of time, may perform another appropriate action, or perform a combination of two or more of these.

In some implementations, the network-activity validation system may perform a corrective action automatically, e.g., without receiving user input for the corresponding network activity. For instance, the network-activity validation system may automatically prevent further setting changes to the firewall application 106 while providing the message for the person. The network-activity validation system may then perform additional actions automatically, based on user input responsive to the message, or both.

The network-activity validation system may receive the data from the sensors 102a-e in response to detecting the network activity, e.g., the firewall application 106 setting change, continuously, or both. For example, the network-activity validation system may continuously receive sensor data from the sensors 102a-e. When the network-activity validation system detects the network activity, the network-activity validation system analyzes the sensor data, e.g., the most recently received sensor data from each of the sensors, to determine whether the person likely initiated the network activity or the network activity is potentially malicious. The network-activity validation system may then perform an action or not based on the determination.

In some examples, the network-activity validation system may request sensor data from one or more of the sensors 102a-e in response to detection of the network activity. The network-activity validation system may request sensor data from all of the sensors 102a-e. The network-activity validation system may request sensor data from only some of the sensors 102a-e. For instance, the network-activity validation system may request sensor data from sensors for which data frequently changes, such as a temperature, and determine not to request sensor data from sensors for which data does not frequently change, such as a security control that indicates whether a front door security alarm is on. When the network-activity validation system only requests some sensor data, the network-activity validation system may use previously received sensor data for the sensors for which updated sensor data was not requested.

In some implementations, the network-activity validation system may provide data that indicates whether the person likely initiated the network activity to another system, e.g., a third party system. The network-activity validation system may provide the data to the other system instead of or in addition to performing other actions based on detection of the network activity. For example, the network-activity validation system may determine an account associated with the network activity. When the network activity relates to a setting change for the firewall application 106, the account may be an account for the firewall application 106, e.g., with the firewall provider. The network-activity validation system may provide data about the network activity to the other system to enable the other system to perform corrective action. For instance, providing the data to the other system may cause the other system to remove a log entry that identifies the network activity, update the account for the person, e.g., reset the account password, or perform another action.

In some examples, the other system may prevent completion of the network activity. For instance, the other system may use data received from the network-activity validation system to determine whether to allow the network activity, e.g., to allow the change to the firewall application 106, or to prevent the network activity.

The network-activity validation system is an example of a system implemented as computer programs on one or more computers in one or more locations, in which the systems, components, and techniques described in this document are implemented. Smart devices, e.g., that include the sensors 102a-e, may include personal computers, mobile communication devices, and other devices that can receive user input and send and receive data over a network, such as the example devices described above. The network (not shown), such as a local area network (LAN), wide area network (WAN), the Internet, or a combination thereof, connects two or more of the network-activity validation system, the sensors 102a-e, or a third party system. The network-activity validation system may use a single server computer or multiple server computers operating in conjunction with one another, including, for example, a set of remote computers deployed as a cloud computing service.

Figure 2:
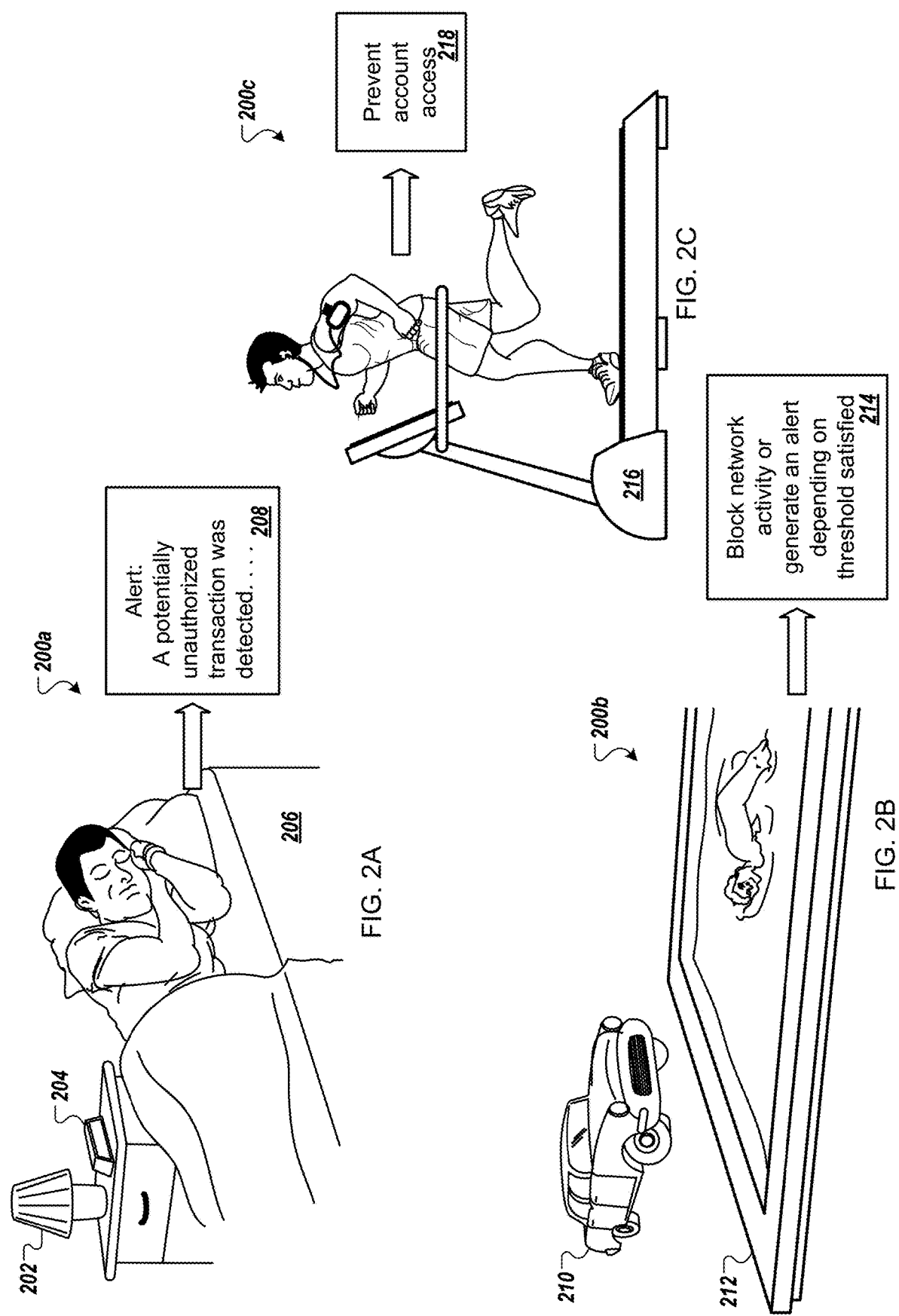
FIGS. 2A-C are examples of other environments in which a network-activity validation system analyzes network activity.

FIGS. 2A-C are examples of other environments 200a-c in which a network-activity validation system analyzes network activity. The network-activity validation system may be the same network-activity validation system as described with reference above to FIG. 1, as described below with reference to FIG. 4, or both. In some implementations, one or more of the environments 200a-c or the environment 100 may be part of another environment. For instance, the environments 100, 200a, and 200c may be part of a single environment, e.g., different parts of a home.

In FIG. 2A, the environment 200a includes a lamp 202, a clock 204, and a bed 206. The lamp 202 includes one or more sensors to detect whether the lamp 202 is in use. For instance, the lamp 202 may include a sensor that determines whether the lamp is on. The lamp 202 may include a motion sensor that detects movement in a room in which a lamp is located.

The clock 204 includes one or more sensors. For example, a first sensor may detect an alarm setting. A second sensor may detect whether the clock is in use, e.g., presenting content from a radio station or streaming music, and whether a sleep setting, that automatically stops content presentation, is enabled. The clock may also include a motion sensor.

The bed 206 can include one or more sensors that detect bed use. In some examples, some of the sensors are integrated into a mattress of the bed 206. In some examples, some of the sensors are attached to the bed 206, e.g., placed between the sheets on the bed 206. The bed sensors may detect user positon on the bed 206, e.g., whether a person is sitting or lying on the bed 206, user movement, or both. For instance, the bed sensors may detect data that allows a determination whether the person is asleep, determination of a person's sleep pattern, or both.

The network-activity validation system can use data from the sensors included in the lamp 202, the clock 204, the bed 206, or a combination of two or more of these, to determine a current physical activity in which a person is participating. For example, the network-activity validation system can use the sensor data to determine whether a person is reading in bed or sleeping.

When the network-activity validation system receives transaction data for the person, the network-activity validation system may use the sensor data to determine whether the transaction is valid. For instance, when the network-activity validation system receives data that identifies a credit card or debit card purchase, the network-activity validation system may analyze the sensor data to determine whether to authorize the transaction. If the network-activity validation system determines that the person is not sleeping or reading in bed, the network-activity validation system may use data from other sensors to determine a likely activity in which the person is participating. For example, the network-activity validation system may determine that the person is likely watching television in their living room based on data received from other sensors, e.g., in the living room, and that the transaction was likely authorized.

When the network-activity validation system determines that the person is likely reading in bed or sleeping, the network-activity validation system may determine that the transaction is likely invalid, to not authorize the transaction, or both. The network-activity validation system may perform one or more actions in response to the determination. For instance, the network-activity validation system may send an error message to another system, e.g., associated with the card, to stop the transaction, may send an alert 208 to an account for the person, e.g., an email or text-message alert, or perform another appropriate action. In some examples, the network-activity validation system may determine that the person likely did not authorize the transaction made at 1:15 AM when, around 11 PM prior to going to bed, the person ran a sleep scene which armed her home security system, set her thermostat to sleep mode, and turned off all her lights. The network-activity validation system may determine that the person likely did not authorize the transaction when the network-activity validation system receives sensor data indicating that no one left the bed from a bed sensor, a motion sensor, or a video camera. The network-activity validation system may determine that the person likely did not authorize the transaction when the network-activity validation system determines that the person did not use her phone after 11 PM, prior to waking up at 6 AM, or both.

In some implementations, the network-activity validation system determines that there is a low likelihood of a person initiating network activity when the person is likely participating in certain activities. For example, when the network-activity validation system determines that the person is likely sleeping, driving, or participating in a sport, e.g., walking, hiking, jogging, or playing soccer, the network-activity validation system determines that there is a low likelihood that the person initiated the network activity, e.g., because of the amount of interaction required to sleep, drive a vehicle, or play a sport. The network-activity validation system may have a threshold likelihood below which a person is not likely to have initiated a network activity. The threshold likelihood may be 40%, 30%, or another threshold value.

In some examples, the network-activity validation system may use multiple different threshold values. For instance, the different thresholds may relate to a corresponding action the network-activity validation system performs.

FIG. 2B is an example of the environment 200b that includes a car 210 and a swimming pool 212. In the environment 200b, the network-activity validation system includes multiple thresholds that define different actions for the network-activity validation system to perform.

For example, when the network-activity validation system receives sensor data from the car 210, the network-activity validation system may determine that a first likelihood that a person driving the car initiated first network activity satisfies a first threshold, e.g., is less than the first threshold. But when the network-activity validation system receives sensor data from the car 210, parked by the swimming pool 212, and one or more sensors near the swimming pool 212, e.g., cameras or motion sensors or thermometers that detect a person in a pool, the network-activity validation system may determine that a second likelihood that the person initiated second network activity does not satisfy the first threshold and instead satisfies a second threshold, e.g., the second likelihood is between the first threshold and the second threshold.

If the network-activity validation system determines that the first likelihood satisfies the first threshold, the network-activity validation system may block 214 completion of the first network activity, e.g., stop the network activity, or perform another appropriate action. If the network-activity validation system determines that the second likelihood satisfies the second threshold but does not satisfy the first threshold, the network-activity validation system may send a message 214 about the second network activity for viewing by the person. For instance, the network-activity validation system performs a different action for the second network activity than the action performed for the first network activity based on the likelihoods that the person may have initiated the network activity.

FIG. 2C is an example of the environment 200c that includes a treadmill 216, a humidity sensor, a temperature sensor, a noise sensor, a motion sensor, or a combination of two or more of these. The network-activity validation system may receive data from one or more of these devices, e.g., sensors, and use the data to determine whether a person is exercising, e.g., using the treadmill 216. For instance, the network-activity validation system may determine that a person is exercising when the treadmill 216 is on, a room has an increased humidity level or increased temperature than normal, there is noise from the user jogging or listening to music or both, there is motion around the treadmill area, or a combination of these. When the network-activity validation system determines that a person is likely exercising and an account for the user is accessed, e.g., an online firewall settings account, the network-activity validation system may determine that the account access is likely not authorized and notify the user about the access, prevent account access 218 for a predetermined period of time, or perform another appropriate action.

In some implementations, when an account is associated with multiple users, the network-activity validation system may perform the analysis for each of the users. For example, when an online firewall account has two users, e.g., for roommates that use the same home network, the network-activity validation system may perform the physical activity analysis for each of the users and determine corresponding likelihoods that the users initiated network activity based on the physical activity analysis.

In some implementations, the network-activity validation system may determine a person's likely current location for use during activity analysis. For instance, the network-activity validation system may use a location of a person's phone, car, keys, wallet, or purse, to name a few examples, while determining a likely current physical activity in which the person is participating and whether the person likely initiated network activity given the location of these items. For example, when a person's wallet is in a gym locker room, the network-activity analysis system may determine that there is a low likelihood that the person initiated any network activity. In some examples, when the person's likely current location is their home and the network-activity validation system determines that network activity was initiated outside the home, e.g., at an airport, the network-activity validation system may determine that there is a low likelihood that the person initiated the network activity.

In some implementations, when the network-activity validation system performs an action based on network activity, the network-activity validation system may generate a message requesting that a user perform a specific action to verify the user's location. For instance, when the network-activity validation system determines that a person is likely cooking in their kitchen, the network-activity validation system may send a message, e.g., a text or email message, for viewing by the person that requests that the person turn their kitchen lights on and off. This may increase security during the validation analysis since it is less likely that a malicious actor has access to the lights.

The network-activity validation system may use a speed at which a person is moving, a type of movement, or both to determine whether the person authorized network activity. For instance, when the network-activity validation system determines that a person is likely on the treadmill 216 but is likely walking, the network-activity validation system may determine that the network activity is likely authorized. The network-activity validation system may use data from multiple sensors to determine whether the network activity is likely authorized. For example, the network-activity validation system may use a location of the persons mobile phone, e.g., in a workout room, data indicating that the person recently accessed their mobile phone, sensors that detect the person, and the movement speed of the person, e.g., that the person is likely walking, to determine that the network activity is likely authorized. The network-activity validation system may determine that the network activity is likely authorized because a user may be more likely to access their account, e.g., firewall account, while walking than if the person were running. The network-activity validation system may determine a likely speed of the person based on global positioning satellite (GPS) data, an activity tracker, e.g., that indicates whether a person is walking or running, or another type of monitoring device.

The network-activity validation system may determine a type of physical movement of a person for use during network activity validation. For example, the network-activity validation system may determine whether a person is jumping or jogging based on an amount and speed of vertical movement of the person, e.g., using an activity tracker. The network-activity validation system may determine that a person is more likely to authorize network activity when the person is walking, sitting, or laying down compared to when the person is running, jumping, or climbing. In some examples, when the network-activity validation system determines that a person is likely watching television while sitting on their couch, e.g., using motion sensors in their living room, activity trackers, other sensors, or a combination of these, the network-activity validation system may determine that the person likely authorized network activity.

In some implementations, a network-activity validation system may prevent certain network activity when a person is performing specific activities. For instance, the network-activity validation system may actively monitor a person's actions, based on user configuration of the network-activity validation system, to determine an activity the person is performing. When the network-activity validation system determines that the activity is one of a predetermined list of activities, the network-activity validation system can prevent initiation of certain network activity, e.g., block the network activity from occurring. For example, upon detection of a person performing one of the predetermined list of activities, the network-activity validation system may determine a list of network activity that should not be allowed during the detected activity or any of the predetermined activities. The network-activity validation system may then send a message to one or more corresponding systems to cause those systems to block the certain network activity.

In some examples, the network-activity validation system may disable use of one or more software applications depending on the person's activity. For instance, the network-activity validation system may send a message to a user device disabling one or more software applications upon detection that the person is driving. The user device may be the person's, e.g., their smart phone, or another person's, e.g., their child's tablet as part of parental control settings.

In some examples, the network-activity validation system may disable use of one or more software applications depending on the type of device, e.g., in addition to the person's activity. For example, a business owned or controlled device may include settings that indicate certain software applications that should be disabled during work hours, e.g., to increase data security at the business. When the network-activity validation system determines that a person who uses the business owned or controlled device is working, e.g., based on a badge swipe, PIN code entry, visual verification, or two or more of these, the network-activity validation system can send a message to the business owned or controlled device, or to another system, to cause the receiving device or system to disable the certain software application.

In some implementations, the network-activity validation system may enable certain software applications when a person is performing certain activities, e.g., to improve security. For example, the network-activity validation system may automatically enable a home security system when the network-activity validation system determines that a person is jogging, e.g., and when the person forgot to enable their home security system. The network-activity validation system may enable one or more computer security applications depending on the person's activity. For instance, the network-activity validation system may enable real-time location tracking of the person during particular activities, e.g., to improve security and upon user configuration of the appropriate settings. The network-activity validation system may disable the location traction when the person completes the activity, e.g., to conserve battery life of the device providing the location tracking. The network-activity validation system may enable a firewall application, an antivirus application, or both, depending on the person's activity. In some examples, the enabled application may reside on a network gateway, e.g., a modem, router, or another network device that can monitor traffic ingress and egress on a network. The network-activity validation system may enable the applications by sending messages to a device on which the application executes.

Figure 3:
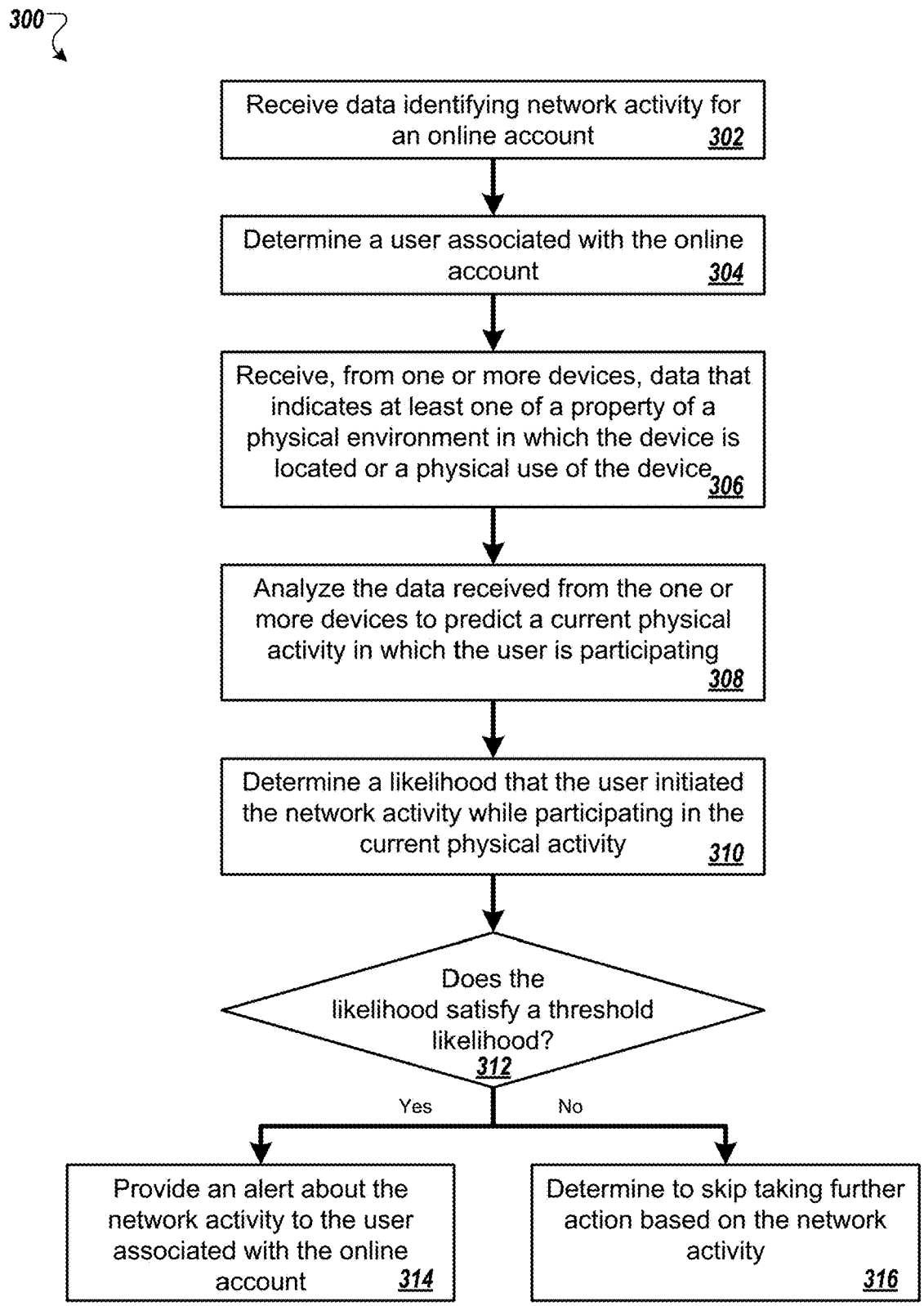
FIG. 3 is a flow diagram of a process for determining whether to take action based on network activity.

FIG. 3 is a flow diagram of a process 300 for determining whether to take action based on network activity. For example, the process 300 can be used by the network-activity validation system described with reference to the environments 100 or 200*a-c*.

A network-activity validation system receives data identifying network activity for an online account (302). For instance, the network-activity validation system receives data for a network security account, such as a firewall or antivirus account. The network-activity validation system may receive the data from another system, from a computer, or from another device. The network activity may be a change to a firewall, access to a network resource, or other network activity.

The network-activity validation system determines a user associated with the online account (304). For instance, the received data may identify the user. In some examples, the received data identifies a user without identifying the online account. In some implementations, the network-activity validation system determines the user based on the network activity, e.g., by determining an account associated with a system, such as a firewall, for which the network activity occurred or by determining an account associated with a network on which the network activity occurred. For example, the network-activity validation system may determine that the network activity occurred in a particular home and determine an account for that particular home.

The network-activity validation system receives, from one or more devices, data that indicates at least one of a property of a physical environment in which the device is located or a physical use of the device (306). Some of the devices may be smart devices. The network-activity validation system may receive some of the data from a sensor as a device. Properties of the physical environment may include a temperature, a humidity level, or a sound level for the physical environment. Properties of the physical use of a device may include when the device was used; a type of use, e.g., opening a door or setting an oven to 500° F.; or whether the device is currently in use. In some implementations, the data may indicate a location of the device. In some implementations, the data may indicate data received from a sensor included in the device, e.g., without including location data.

The network-activity validation system analyzes the data received from the one or more devices to predict a current physical activity in which the user is participating (308). The network-activity validation system may analyze data from each device separately to predict the current physical activity. In some examples, the network-activity validation system may analyze the data from two or more devices together to predict the current physical activity. When the network-activity validation system determines two physical activities, both of which have at least a threshold likelihood of a user participating in the corresponding activity, the network-activity validation system may request data from additional sensors, discard data from some of the sensors for which there is a discrepancy, or perform other analysis on sensor data to predict a single current physical activity for the user which has the highest likelihood that the user is participating in the activity.

The network-activity validation system determines a likelihood that the user initiated the network activity while participating in the current physical activity (310). For example, when the network-activity validation system determines that the user is likely sleeping, driving a vehicle, or participating a sport, the network-activity validation system may determine that there is a low likelihood that the user initiated the network activity, e.g., that the likelihood is less than a lowest threshold likelihood. The low likelihood indicates that the user probably did not initiate the network activity, e.g., probably did not change the firewall application setting.

When the network-activity validation system determines two potential physical activities for the person, the network-activity validation system may determine a likelihood that the user initiated the network activity for each of the activities. The network-activity validation system may continue the process 300 for each of the likelihoods, e.g., separately.

The network-activity validation system determines whether the likelihood satisfies a threshold likelihood (312). When the likelihood is less than, equal to, or either, the threshold likelihood, the network-activity validation system may determine that the likelihood satisfies the threshold likelihood. The network-activity validation system may determine that the likelihood does not satisfy the threshold likelihood when the likelihood is greater than, equal to, or either, the threshold likelihood.

In response to determining that the likelihood satisfies the threshold likelihood, the network-activity validation system provides an alert about the network activity to the user associated with the online account (314). For instance, the network-activity validation system may generate a message for presentation to a user. The message may identify information about the network activity. In some examples, the message may identify corrective action to take based on the network activity.

In response to determining that the likelihood does not satisfy the threshold likelihood, the network-activity validation system determines to skip taking further action based on the network activity (316). For example, the network-activity validation system discards the received data for the network activity and does not take any additional action based on the network activity.

When the network-activity validation system determines multiple likelihoods that the person initiated the network activity based on different potential physical activities, the network-activity validation system may perform an action when at least one of the likelihoods satisfies the threshold likelihood. In these implementations, the network-activity validation system may determine to skip taking further action when none of the likelihoods satisfies the threshold likelihood.

The order of steps in the process 300 described above is illustrative only, and the determination whether to take action based on network activity can be performed in different orders. For example, the network-activity validation system may receive data from the one or more devices before or concurrently with the determination of the user associated with the online account. In some examples, the network-activity validation system may receive data from the devices before or concurrently with receipt of the data identifying the network activity.

In some implementations, the process 300 can include additional steps, fewer steps, or some of the steps can be divided into multiple steps. For example, the network-activity validation system may perform steps 302 through 312 without performing either step 314 or 316. Instead, when the network-activity validation system determines that the likelihood satisfies the threshold likelihood, the network-activity validation system may perform one or more automated actions based on the network activity without requesting or receiving input from a user. In some implementations, the network-activity validation system might not receive data from a device, e.g., might not perform step 306. For instance, the network-activity validation system can retrieve sensor data from a database, e.g., that was previously received from a device, such as a smart sensor, and analyze the retrieved data, e.g., perform step 308 using the retrieved data.

In some implementations, the network-activity validation system may request data from other systems as part of an activity validation process. For example, the network-activity validation system may request data from a drone, e.g., an aerial or land based drone, for use when validating network activity. The network-activity validation system can request that the drone capture one or more images of a person, when the system has appropriate user authorization to capture such images, and use the images to determine the person's current activity and whether to authorize the network activity.

The network-activity validation system may send a data request to another system when the network-activity validation system determines that the network-activity validation system does not have at least a threshold certainty of what activity the person is performing. For instance, the network-activity validation system may determine that a person might be cooking in his kitchen but alternatively might be watching television in his kitchen while eating a snack, both with a similar degree of certainty. Since, in this example, the network activity would not be authorized if the person was cooking but might be authorized if the person is watching television (or a different action would be performed depending on the person's activity), the network-activity validation system does not have at least the threshold certainty of the person's activity. The network-activity validation system can then send a message to a drone that causes the drone to capture an image of the person. The network-activity validation system can analyze the image of the person to determine which activity the person is performing and whether to validate the network activity. When the image analysis results in a determination that the person is cooking, the network-activity validation system may block the network activity. When the image analysis results in a determination that the person is watching television, the network-activity validation system may allow the network activity, e.g., determine not to perform an action, or generate an alert about the network activity.

Figure 4:
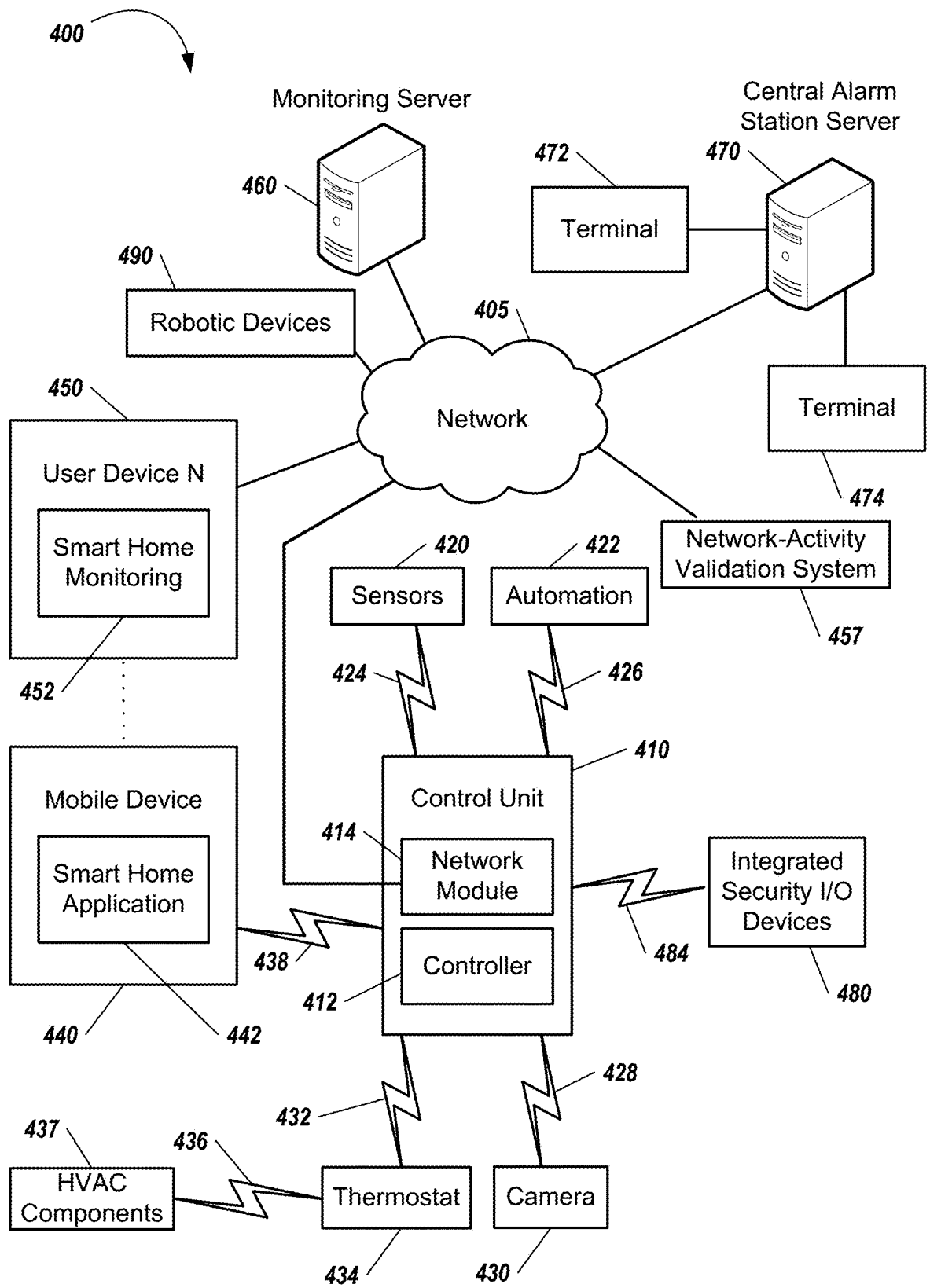
FIG. 4 is a diagram illustrating an example of a home monitoring system.

FIG. 4 is a diagram illustrating an example of a home monitoring system 400. The home monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system 400 may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data. The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. Also, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area or video images of the area in which multiple images of the area are captured at a relatively high frequency (e.g., thirty images per second) or both. The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries, e.g., if located remotely from the control unit 410. The camera 430 may employ a small solar cell to recharge the battery when light is available. The camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

The system 400 includes a network-activity validation system 457. The network-activity validation system 457 can be computing devices (e.g., a computer, microcontroller, FPGA, ASIC, or other device capable of electronic computation) capable of receiving data related to the network-activity validation system and communicating electronically with the monitoring system control unit 410. In some examples, the network-activity validation system 457 may be part of the control unit 410, the monitoring server 460, the central alarm station server 470, or another device in the system 400. The network-activity validation system 457 may perform one or more operations described above with reference to FIGS. 1, 2A-C, and 3. For instance, the network-activity validation system 457 may receive data from the sensors 420 and separate data that identifies network activity. The network-activity validation system 457 may use the data from the sensors 420 to determine whether an authorized person, e.g., a person associated with the system 400, initiated the network activity. When the network-activity validation system 457 determines that an authorized person, e.g., an owner of the house that includes some of the sensors 420, did not initiate the network activity, the network-activity validation system 457 may perform one or more actions based on the network activity.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and also roll along the ground, walls, or ceiling) and land vehicle type devices (e.g., automated cars that drive around a home). In some cases, the robotic devices 490 may be robotic devices 490 that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensor that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the home monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the home monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events (e.g., alarm events) generated by the control unit 410. In this example, the monitoring server 460 may exchange electronic communications with the network module 414 included in the control unit 410 to receive information regarding events (e.g., alerts) detected by the control unit 410. The monitoring server 460 also may receive information regarding events (e.g., alerts) from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system 400 and perform analysis of sensor and image data received from the monitoring system 400. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The central alarm station server 470 is an electronic device configured to provide alarm monitoring service by exchanging communications with the control unit 410, the one or more mobile devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the smart home application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart home application 442. The smart home application 442 refers to a software/firmware program running on the corresponding mobile device that enables the user interface and features described throughout. The user device 440 may load or install the smart home application 442 based on data received over a network or data received from local media. The smart home application 442 runs on mobile devices platforms, such as iPhone, iPod touch, Blackberry, Google Android, Windows Mobile, etc. The smart home application 442 enables the user device 440 to receive and process image and sensor data from the monitoring system.

The user device 450 may be a general-purpose computer (e.g., a desktop personal computer, a workstation, or a laptop computer) that is configured to communicate with the monitoring server 460 and/or the control unit 410 over the network 405. The user device 450 may be configured to display a smart home user interface 452 that is generated by the user device 450 or generated by the monitoring server 460. For example, the user device 450 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, the robotic devices 490, and the network-activity validation system 457. The one or more user devices 440 and 450 receive data directly from the sensors 420, the home automation controls 422, the camera 430, the robotic devices 490, and the network-activity validation system 457 and sends data directly to the sensors 420, the home automation controls 422, the camera 430, the robotic devices 490, and the network-activity validation system 457. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, the robotic devices 490, and the network-activity validation system 457 are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, the robotic devices 490, and the network-activity validation system 457 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, the robotic devices 490, and the network-activity validation system 457 to a pathway over network 405 when the one or more user devices 440 and 450 are farther from the sensors 420, the home automation controls 422, the camera 430, the thermostat 434, the robotic devices 490, and the network-activity validation system 457. In some examples, the system leverages GPS information from the one or more user devices 440 and 450 to determine whether the one or more user devices 440 and 450 are close enough to the sensors 420, the home automation controls 422, the camera 430, the thermostat 434, the robotic devices 490, and the network-activity validation system 457 to use the direct local pathway or whether the one or more user devices 440 and 450 are far enough from the sensors 420, the home automation controls 422, the camera 430, the thermostat 434, the robotic devices 490, and the network-activity validation system 457 that the pathway over network 405 is required. In other examples, the system leverages status communications (e.g., pinging) between the one or more user devices 440 and 450 and the sensors 420, the home automation controls 422, the camera 430, the thermostat 434, the robotic devices 490, and the network-activity validation system 457 to determine whether communication using the direct local pathway is possible. If communication using the direct local pathway is possible, the one or more user devices 440 and 450 communicate with the sensors 420, the home automation controls 422, the camera 430, the thermostat 434, the robotic devices 490, and the network-activity validation system 457 using the direct local pathway. If communication using the direct local pathway is not possible, the one or more user devices 440 and 450 communicate with the sensors 420, the home automation controls 422, the camera 430, the thermostat 434, the robotic devices 490, and the network-activity validation system 457 using the pathway over network 405.

In some implementations, the system 400 provides end users with access to images captured by the camera 430 to aid in decision-making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system 400 and other events sensed by the monitoring system 400 may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system that is configured to monitor a property, the monitoring system comprising:
   a sensor that is located at the property and that is configured to generate sensor data that reflects an attribute of the property; and
   a monitor control unit that comprises at least one processor configured to:
      receive data identifying network activity for an online account, the network activity being a firewall application setting change for a firewall application associated with a computer located at the property and the online account being an online firewall account;
      determine a user associated with the online firewall account;

based on the sensor data, determine a current physical activity in which the user is participating within the property by determining that the user is participating in a sport;

access stored data that indicates, for a plurality of physical activities including the current physical activity of the sport, a level of user interaction required to participate in each of the plurality of physical activities;

analyze, using the accessed data, the current physical activity of participating in the sport;

based on analyzing, using the accessed data, the current physical activity of participating in the sport, determine a likelihood that the user initiated the firewall application setting change for the firewall application associated with the computer located at the property while participating in the current physical activity of the sport within the property;

determine whether the likelihood satisfies a threshold likelihood; and in response to determining that the likelihood does not satisfy the threshold likelihood, provide an alert about the network activity to the user associated with the online firewall account.

2. The monitoring system of claim 1, wherein the at least one processor of the monitor control unit is configured to:
determine whether the likelihood satisfies the threshold likelihood by determining that the likelihood does not satisfy the threshold; and
prevent completion of the network activity for the online firewall account.

3. The monitoring system of claim 2, wherein the at least one processor of the monitor control unit is configured to:
prevent completion of the network activity for the online firewall account by instructing a third party system to prevent completion of the network activity for the online firewall account.

4. The monitoring system of claim 1, wherein the at least one processor of the monitor control unit is configured to:
determine whether an arming status of the monitoring system is armed stay, armed away, or unarmed; and
determine the current physical activity in which the user is participating based on whether the arming status of the monitoring system is armed stay, armed away, or unarmed.

5. The monitoring system of claim 1, comprising:
an electronic device that is associated with the user and that generates location data or motion data for the user, wherein the at least one processor of the monitor control unit is configured to determine a current physical activity in which the user is participating by:
determining a physical location of the electronic device based on the location data or the motion data; and
determining the current physical activity of the user based on the physical location of the electronic device.

6. The monitoring system of claim 5, wherein the at least one processor of the monitor control unit is configured to:
determine a physical location of the user based on the physical location of the electronic device; and
determine the current physical activity of the user by determining the current physical activity of the user based on the physical location of the user.

7. The monitoring system of claim 1, wherein the at least one processor of the monitor control unit is configured to:
determine the threshold likelihood based on the network activity.

8. The monitoring system of claim 1, wherein the at least one processor of the monitor control unit is configured to:
determine the current physical activity in which the user is participating based on a location of the sensor.

9. A computer-implemented method, comprising:
receiving, by a monitoring system that is configured to monitor a property, data identifying network activity for an online account, the network activity being a firewall application setting change for a firewall application associated with a computer located at the property and the online account being an online firewall account;

determining, by the monitoring system, a user associated with the online firewall account;

based on sensor data that is from a sensor that is located at the property and that reflects an attribute of the property, determining, by the monitoring system, a current physical activity in which the user is participating within the property by determining that the user is participating in a sport;

accessing stored data that indicates, for a plurality of physical activities including the current physical activity of the sport, a level of user interaction required to participate in each of the plurality of physical activities;

analyzing, using the accessed data, the current physical activity of participating in the sport;

based on analyzing, using the accessed data, the current physical activity of participating in the sport, determining, by the monitoring system, a likelihood that the user initiated the firewall application setting change for the firewall application associated with the computer located at the property while participating in the current physical activity of the sport within the property;

determining, by the monitoring system, whether the likelihood satisfies a threshold likelihood; and in response to determining that the likelihood does not satisfy the threshold likelihood, providing, by the monitoring system, an alert about the network activity to the user associated with the online firewall account.

10. The method of claim 9, comprising:
determining whether the likelihood satisfies the threshold likelihood by determining that the likelihood does not satisfy the threshold; and
preventing completion of the network activity for the online firewall account.

11. The method of claim 9, comprising:
determining whether an arming status of the monitoring system is armed stay, armed away, or unarmed, determining the current physical activity in which the user is participating based on whether the arming status of the monitoring system is armed stay, armed away, or unarmed.

12. The method of claim 9, comprising:
receiving, from an electronic device that is associated with the user, location data or motion data of the user;
determining a physical location of the electronic device based on the location data or the motion data; and
determining the current physical activity of the user based on the physical location of the electronic device.

13. The monitoring system of claim 1, wherein the firewall application setting change for the firewall application associated with the computer located at the property comprises a change to a list of permitted applications installed on the computer that are allowed access to a network.

14. The monitoring system of claim 1, wherein the firewall application setting change for the firewall application associated with the computer located at the property comprises a change to access to a particular computer directory of the computer located at the property.

15. The monitoring system of claim 1, wherein the at least one processor of the monitor control unit is configured to:
receive data indicating user selection that the firewall application setting change is unauthorized; and
based on the received data indicating user selection that the firewall application setting change is unauthorized, remove the firewall application setting change and block further changes to the firewall application for a predetermined period of time.

16. A monitoring system that is configured to monitor a property, the monitoring system comprising:
a sensor that is located at the property and that is configured to generate sensor data that reflects an attribute of the property; and
a monitor control unit that comprises at least one processor configured to:
receive data identifying network activity for an online account, the network activity being a firewall application setting change for a firewall application associated with a computer located at the property and the online account being an online firewall account;
determine a user associated with the online firewall account;
based on the sensor data, determine a current physical activity in which the user is participating within the property by determining that the user is preparing food;
access stored data that indicates, for a plurality of physical activities including the current physical activity of preparing the food, a level of user interaction required to participate in each of the plurality of physical activities;
analyze, using the accessed data, the current physical activity of preparing the food;
based on analyzing, using the accessed data, the current physical activity of preparing the food, determine a likelihood that the user initiated the firewall application setting change for the firewall application associated with the computer located at the property while participating in the current physical activity of preparing the food within the property;
determine whether the likelihood satisfies a threshold likelihood; and
in response to determining that the likelihood does not satisfy the threshold likelihood, provide an alert about the network activity to the user associated with the online firewall account.

* * * * *

UNITED STATES PATENT AND TRADEMARK OFFICE
CERTIFICATE OF CORRECTION

PATENT NO. : 11,032,177 B2  
APPLICATION NO. : 16/451564  
DATED : June 8, 2021  
INVENTOR(S) : Matthew Daniel Correnti and Robert Nathan Picardi Page 1 of 1

It is certified that error appears in the above-identified patent and that said Letters Patent is hereby corrected as shown below:

In the Claims

In Claim 15, Column 31, Line 11, delete "fora" and insert -- for a --, therefor.

In Claim 16, Column 32, Line 5, delete "fora" and insert -- for a --, therefor.

Signed and Sealed this  
Second Day of November, 2021

Drew Hirshfeld  
*Performing the Functions and Duties of the*  
*Under Secretary of Commerce for Intellectual Property and*  
*Director of the United States Patent and Trademark Office*